United States Patent [19]

D'Anna et al.

[11] Patent Number: 5,249,926

[45] Date of Patent: Oct. 5, 1993

[54] BLADE RETENTION PIN SYSTEM FOR A HELICOPTER BLADE FOLDING SYSTEM

[75] Inventors: Frank P. D'Anna, Seymour; Kevin A. White, Shelton, both of Conn.

[73] Assignee: United Technologies Corporation, Hartford, Conn.

[21] Appl. No.: 14,896

[22] Filed: Feb. 8, 1993

[51] Int. Cl.⁵ .............................................. B64C 11/28
[52] U.S. Cl. ...................................... 416/143; 416/63; 416/142
[58] Field of Search ................. 416/63, 142, 143, 204; 403/73

[56] References Cited

U.S. PATENT DOCUMENTS

| | | | |
|---|---|---|---|
| 2,966,947 | 1/1961 | Batesole | 416/143 |
| 3,135,333 | 6/1964 | Cruz et al. | 416/143 |
| 3,158,203 | 11/1964 | Grunfelder | 416/143 |
| 4,252,504 | 2/1981 | Covington et al. | 416/143 |
| 4,268,222 | 5/1981 | Bernard | 416/143 |
| 4,493,663 | 10/1985 | Richmond | 416/63 |
| 4,712,978 | 12/1987 | Tiemann | 416/143 |

Primary Examiner—Edward K. Look
Assistant Examiner—Michael S. Lee
Attorney, Agent, or Firm—Terrance J. Radke

[57] ABSTRACT

A blade retention pin system is operative to secure the blade cuff of a main rotor blade of a helicopter in combination with a spindle assembly of the main rotor hub assembly for main rotor assembly operations and is readily reconfigurable to accommodate blade folding operations. The blade retention pin system includes first and second pin assemblies, each pin assembly including a retainer pin and a handle subassembly, which includes a retainer member and a spring member in superposed abutting combination, pivotably mounted in combination therewith. The first pin assembly includes, in addition, a safety pin subassembly secured in combination therewith. Each retainer pin is inserted into aligned apertures of the blade cuff and spindle assembly and locked in place by pivoting the handle subassembly from an unlocked to a locked position wherein the retainer member engages the retainer pin and the spring member is biased onto the retainer pin to abuttingly engage the retainer member.

10 Claims, 9 Drawing Sheets

BLADE RETENTION PIN SYSTEM FOR A HELICOPTER BLADE FOLDING SYSTEM

DESCRIPTION

1. Related Application

The present application is related to co-pending, commonly-owned U.S. patent application Ser. No. 07/977,996, entitled "A Pitch Actuation System Restraint Device for A Helicopter Blade Folding System", filed Nov. 18, 1992.

2. Technical Field

The present invention relates to blade folding systems for helicopters, and more particularly, to a blade retention pin system for a helicopter blade folding system that facilitates blade folding operations.

3. Background of the Invention

While the flight capabilities of helicopters makes them effective vehicles for a wide variety of flight missions, the utility of helicopters in certain circumstances may be limited by the overall structural envelopes thereof. To provide the power required to support the flight capabilities of helicopters, the main rotor assemblies of helicopters incorporate a plurality of main rotor blades having large radial dimensions. The large radial dimensions of helicopter rotor assemblies results in helicopters having large structural envelopes that occupy an inordinate amount of space. The large structural envelopes of helicopters may limit their utility in some circumstances.

For example, helicopters utilized for maritime flight operations may be required to conduct operations from ships for extended periods of time. Shipboard space is generally at a premium, and the large structural envelopes of helicopters means that stowage of helicopters during periods of non-use requires a large allocation of such limited space. The same concern arises for helicopters operating from oceanic oil rigs wherein helicopters are stowed during periods of non-use. In addition to space limitations arising from the structural envelopes of helicopters due to the main rotor assemblies, the main rotor assemblies of stowed helicopters that are exposed to the environment are vulnerable to wind gusts. Furthermore, strategic and tactical considerations in the military utilization of helicopters has led to a requirement for helicopters having main rotor assemblies that may be readily reconfigured for rapid deployment, routine transport, and/or stowage through reduction in the structural envelopes of the helicopters.

Several options are available to reduce the structural envelopes of helicopters to facilitate rapid deployment, routine transport, stowage, and/or to reduce the vulnerability thereof to environmental conditions. One option is to design the main rotor assemblies of helicopters so that the main rotor blades may be removed from the rotor hub assembly. While this is a viable solution in some circumstances, it should be appreciated that such main rotor blade assemblies may be unnecessarily complex. In addition, it should be appreciated that removal of the main rotor blades tends to be time consuming and labor intensive. Moreover, these same time constraints and labor requirements exist when the helicopter is reconfigured for subsequent flight operations. Therefore, reduction of the structural envelope of helicopters by removal of the main rotor blades may not be the most viable option under some circumstances.

Another option available to reduce the structural envelopes of helicopters is to design the main rotor assemblies thereof so that the main rotor blades may be folded about the main rotor hub assembly. Main rotor blade folding operations may be implemented either automatically via hydraulic systems or manually. Automatically controlled blade folding operations require relatively extensive modifications to the main rotor assembly to incorporate the necessary mechanical apparatus to effectuate automatic blade folding. In addition, specialized software must be incorporated in the automatic flight control system to regulate automatic blade folding operations. Representative examples of such mechanical apparatus and specialized software are illustrated in U.S. Pat. Nos. 4,354,234, 4,284,387, and 3,743,441. Such mechanical apparatus unnecessarily increase the complexity of the main rotor assembly. In addition, such mechanical apparatus and software increases the overall system cost of the helicopter.

Manual blade folding operations, in contrast, generally require minimal mechanical modifications to the main rotor assembly, and do not generally require specialized software. In light of the minimal mechanical modifications required to incorporate blade folding capabilities in helicopter main rotor assemblies, this option represents a viable approach in a number of circumstances. For example, for maritime operations and oil rig use, manual blade folding operations may be effected with minimal manpower in a short period of time to reduce the overall structural envelope of helicopters. The modifications to the main rotor assembly required to accommodate manual blade folding operations result in only an incremental increase in the complexity of the main rotor assembly and the overall systems costs of the helicopter.

In the main rotor assembly of a helicopter, each main rotor blade is mechanically coupled to the main rotor hub assembly. The mechanical coupling means must be designed to react the dynamic loads developed in the main rotor assembly during operation thereof. To accommodate manual blade folding operations, the mechanical coupling means must be capable of being reconfigured to allow the main rotor blade to be pivoted to a stowage configuration. In addition, the reconfigured mechanical coupling means must provide the pivotal axis for the manual blade folding operations.

Mechanical coupling means that accommodate manual blade folding operations are known in the prior art. Such mechanical coupling means may comprise a solid pin system or an expandable pin system. Generally these pin systems require specialized tooling to reconfigure the pin system to accommodate manual blade folding operations. In addition, the reconfiguration of such pin systems may result in a plurality of loose components which must be accounted for so that the main rotor assembly may be subsequently reconfigured for flight operations.

A need exists for a mechanical coupling means for the main rotor assembly of a helicopter that secures the main rotor blades in combination with the main rotor hub assembly and that is readily reconfigurable to accommodate manual blade folding operations. The mechanical coupling means should be capable of being readily reconfigured to accommodate manual blade folding operations without the use of tooling and/or without resulting in loose components. The mechanical coupling means should be easy to install and/or remove.

SUMMARY OF THE INVENTION

One object of the present invention is to provide a blade retention pin system for a helicopter that is operative to secure the main rotor blades to the main rotor hub assembly for main rotor assembly operations and that is readily reconfigurable to accommodate manual blade folding operations.

Another object of the present invention is to provide a blade retention pin system that is capable of being readily reconfigured to accommodate manual blade folding operations without the use of tooling and/or without resulting in loose components.

Yet another object of the present invention is to provide a blade retention pin system that is readily reconfigurable to provide a pivotal axis for manual blade folding operations.

Still a further object of the present invention is to provide a blade retention pin system that is readily installed to secure the main rotor blades to the main rotor hub assembly and that is readily removable to remove the main rotor blades from the main rotor hub assembly.

These and other objects are provided by a blade retention pin system according to the present invention comprising first and second pin assemblies that are operative to secure the blade cuff of a main rotor blade of a helicopter in combination with the spindle assembly of the main rotor hub assembly and that are readily reconfigurable to accommodate manual blade folding operations. Each pin assembly includes a retainer pin and a handle subassembly pivotably mounted in combination therewith. Each retainer pin is an integral component that includes a circumferential groove adjacent to a rounded end portion having a safety pin aperture formed therethrough. The handle subassembly includes a retainer member, which has a U-shaped slot complementary to the circumferential groove, and a spring member, which has an engagement aperture complementary to the rounded end portion, in superposed abutting combination and secured in combination with a handle member. The first pin assembly further includes a safety pin subassembly comprising a self-locking safety pin secured in combination with the handle subassembly thereof.

To install the blade retention pin system to secure the blade cuff in combination with the spindle assembly, the retainer pins of the first and second pin assemblies are inserted in aligned apertures of the blade cuff and spindle assembly. The handle subassembly of each pin assembly is then pivoted from an unlocked position to a locked position, causing the U-shaped slot of the retainer member to mechanically engage the circumferential groove and the engagement hole of the spring member to be biased onto the rounded end portion. The retainer member and the spring member in combination lock the retainer pin in place. The safety pin is then inserted through the respective safety pin apertures and manually locked. The safety pin provides a redundant locking capability by mechanically securing the retainer members and the spring members in mechanical engagement with the respective retainer pins.

To reconfigure the blade retention pin system for each main rotor blade to be subjected to manual blade folding operations, the safety pin is disengaged from the retainer pins of the first and second pin assemblies thereof. The spring member of the forward pin assembly is manually disengaged from the retainer pin, the handle subassembly is pivoted to the unlocked position to disengage the retainer member from the retainer pin, and the forward pin assembly removed. The remaining installed pin assembly functions as the pivotal axis for the manual blade folding operation.

BRIEF DESCRIPTION OF THE DRAWINGS

A more complete understanding of the present invention and the attendant features and advantages thereof may be had by reference to the following detailed description when considered in conjunction with the accompanying drawings wherein.

DETAILED DESCRIPTION OF THE PREFERRED EMBODIMENT

A blade retention pin system according to the present invention is operative to secure the main rotor blades of a helicopter in combination with the main rotor hub assembly during main rotor assembly operations and is readily reconfigurable to accommodate blade folding operations when it is deemed advisable to reduce the structural envelope of the helicopter to facilitate stowage, or to reduce the vulnerability of the main rotor assembly to environmental conditions. The blade retention pin system described in the following paragraphs has been design optimized for use in combination with the modified main rotor assembly of the C model of the S-76 ® helicopter (S-76 is a registered trademark of the Sikorsky Aircraft Division of United Technologies Corporation). The main rotor assembly of the S-76 ® helicopter is an articulated main rotor hub system. The pitch actuation system of the S-76 ® helicopter is a hydromechanical system, which includes pilot input devices (collective; cyclic), interfacing mechanical linkages, hydraulic servo cylinders, a swashplate assembly (rotating and stationary swashplates), pitch control rods, and pitch control horns, that is operative to provide pitch inputs to the rotor blades.

Figure 1:
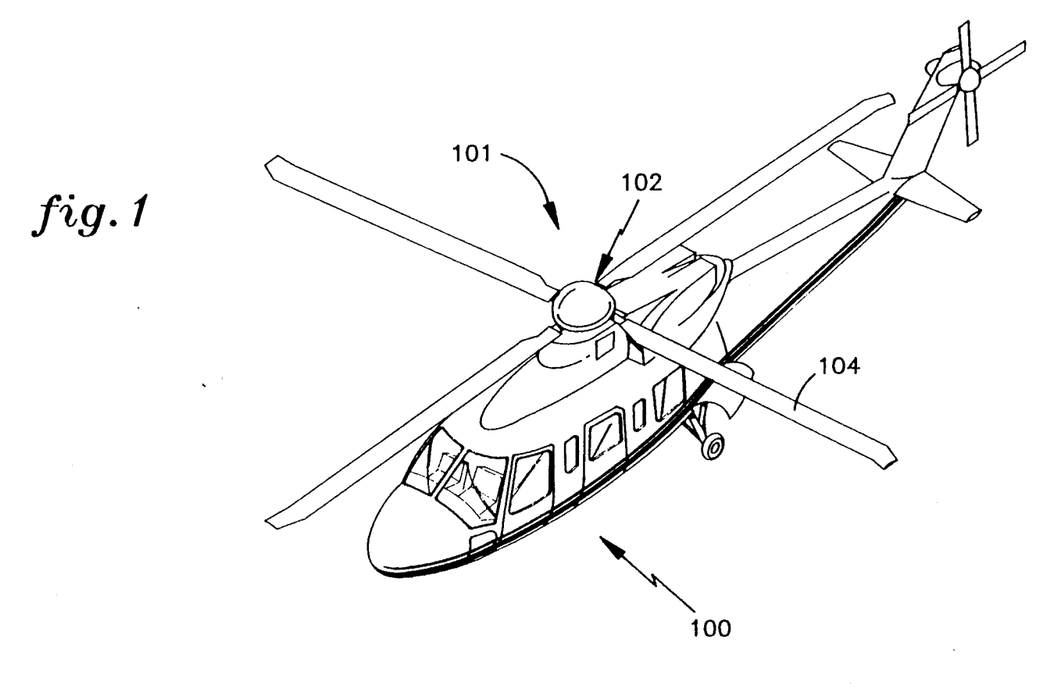
FIG. 1 is a perspective view of an S-76 ® helicopter.

With reference to FIG. 1, the S-76® helicopter 100 has a main rotor assembly 101 comprising a main rotor hub assembly 102 having four main rotor blades 104 secured in combination therewith. As described hereinbelow in further detail, the main rotor assembly 101 of the S-76® helicopter 100 has been modified so that two of the main rotor blades 104 may be folded utilizing a manual blade folding procedure that rearranges the main rotor assembly 101 into a stowage configuration (see FIGS. 8, 8A). The blade retention pin system according to the present invention is utilized to effectuate manual folding of the two main rotor blades 104 of the main rotor assembly 101 of the S-76® helicopter 100.

Figure 2:
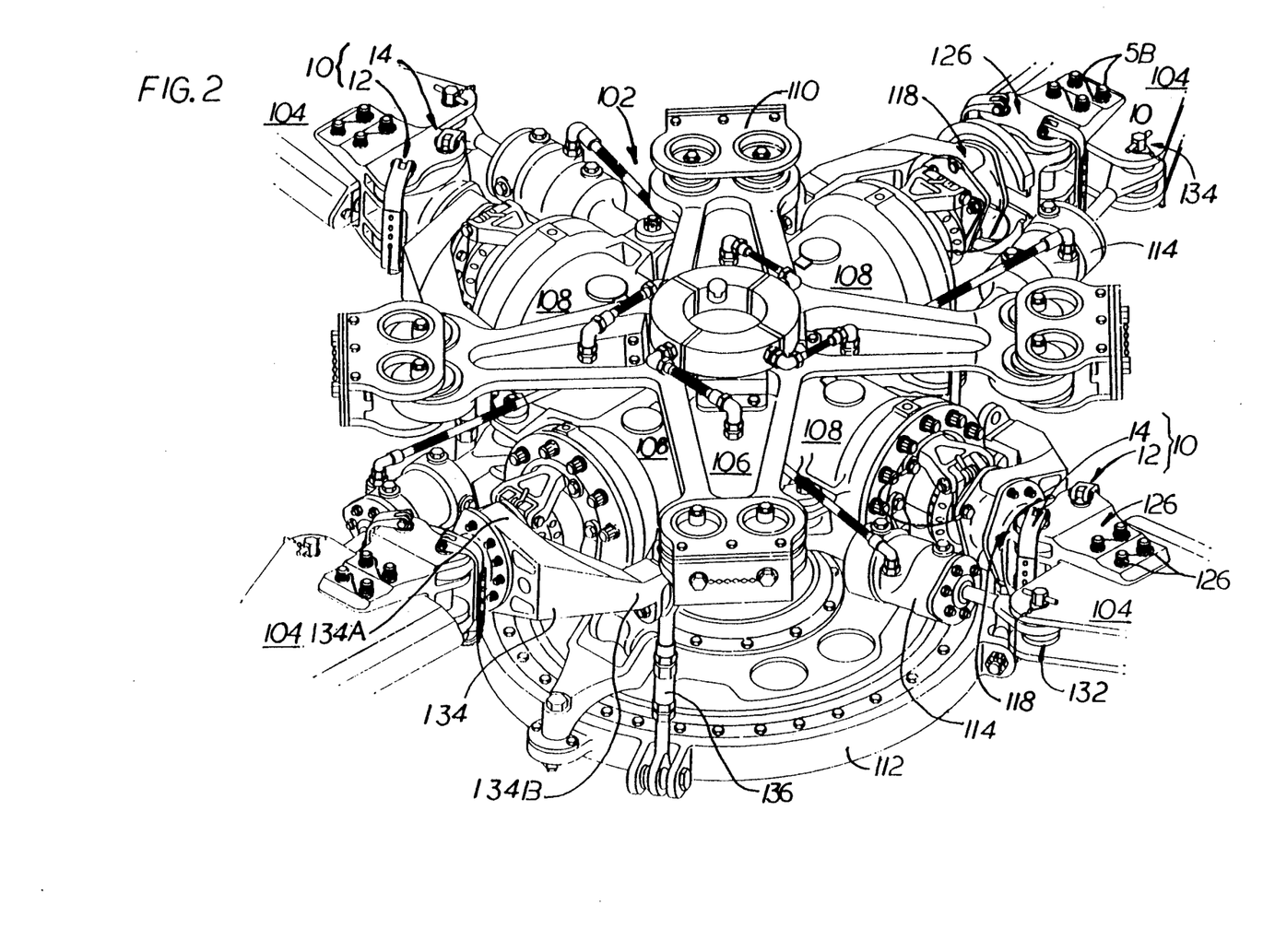
FIG. 2 is a partial perspective view of the main rotor assembly of the S-76 ® helicopter of FIG. 1.

A more detailed view of the S-76® main rotor assembly 101, and in particular, the main rotor hub assembly 102, is illustrated in FIG. 2 and includes a rotor hub 106 having four arms 108. The rotor hub assembly 102 further includes a bifilar vibration absorber 110 and a rotating swashplate 112. Associated with each rotor hub arm 108 is a damper 114 which has one end thereof secured to a pair of damper lugs 116 (see also FIG. 3) incorporated as part of the rotor hub arm 108. Each pair of damper lugs 116 of the modified S-76® main rotor hub assembly 102 is configured to accommodate installation of a pitch actuation restraint device that is utilized for the S-76® helicopter 100 blade folding operations.

Figure 3:
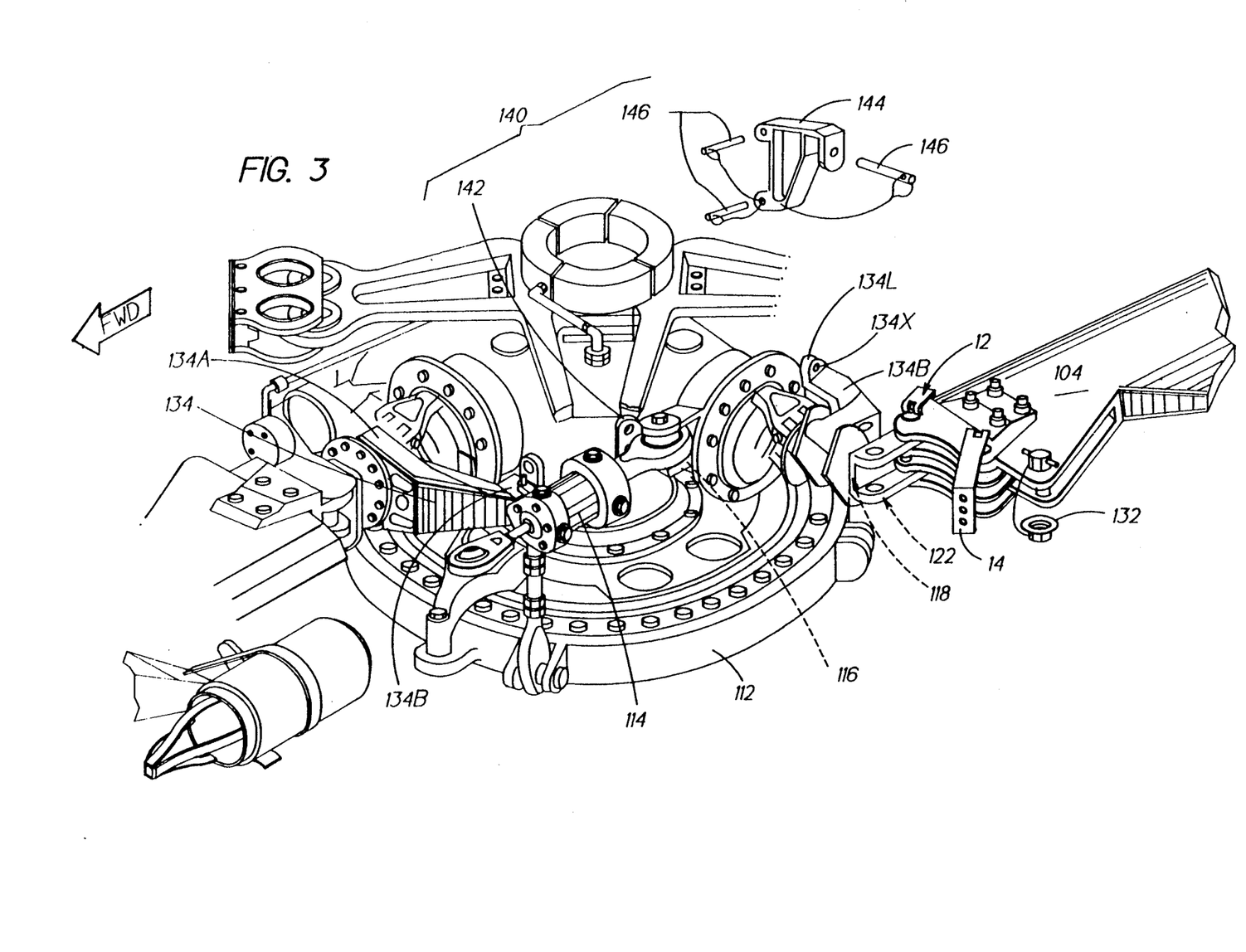
FIG. 3 is a partial exploded view illustrating the structural interrelationship between the main rotor assembly of FIG. 2, with one rotor blade folded, and a pitch actuation system restraint device.
Figure 4:
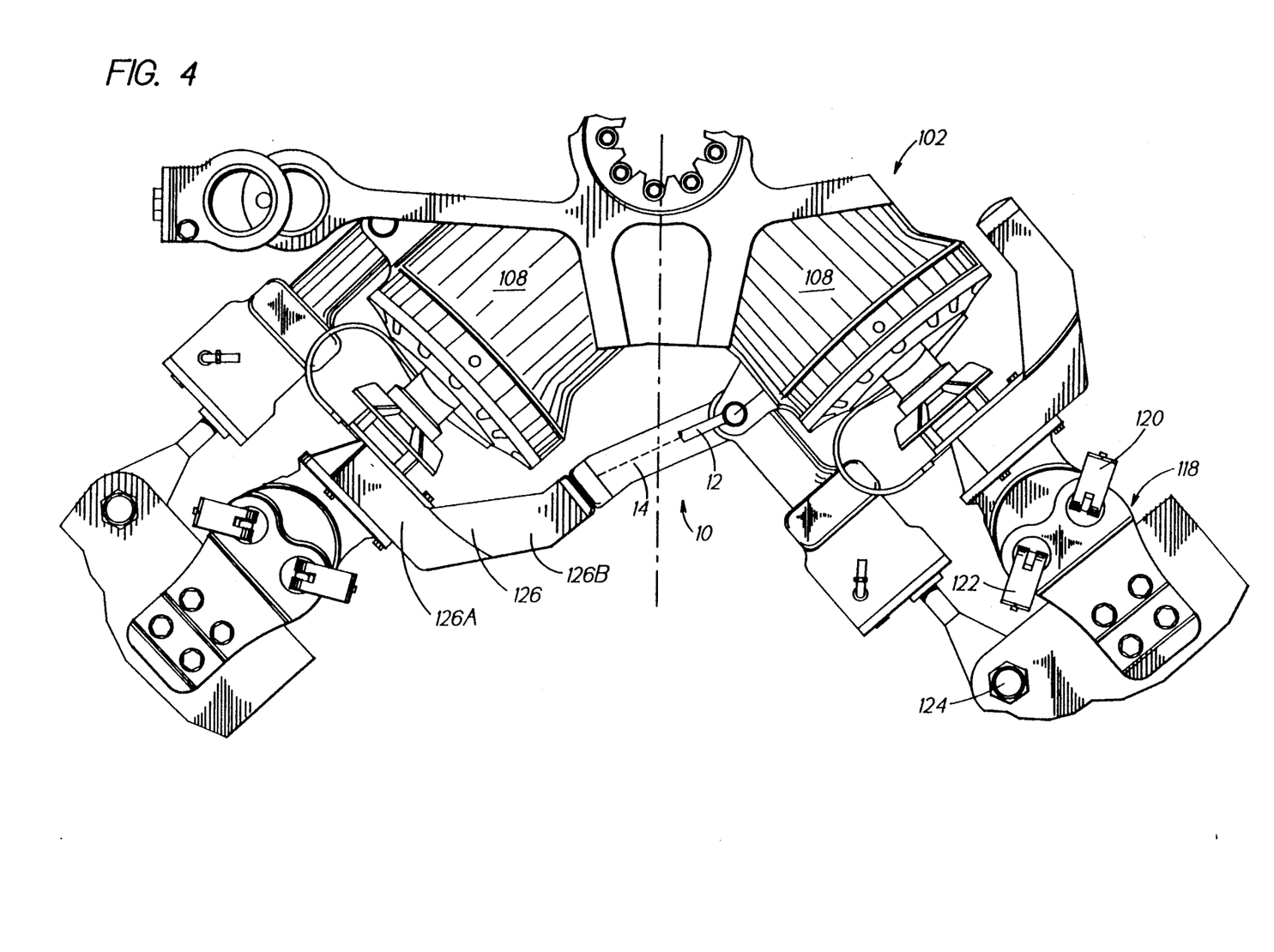
FIG. 4A illustrates the spindle assembly of the main rotor assembly of FIG. 3.
FIG. 4B is a plan view of the blade assembly cuff of the main rotor assembly of FIG. 3.
FIG. 4C is a cross-sectional view of the blade assembly cuff of FIG. 4B.
Figure 4A:
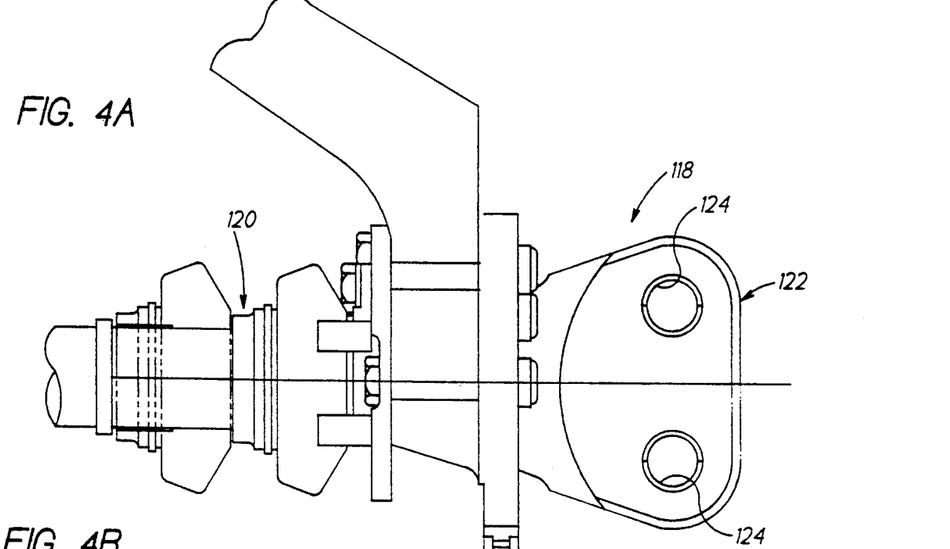
Figure 4B:
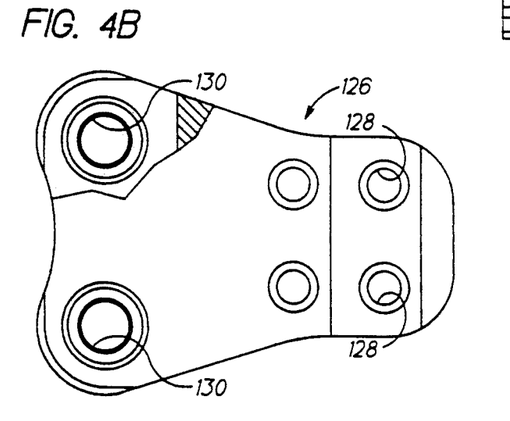
Figure 4C:
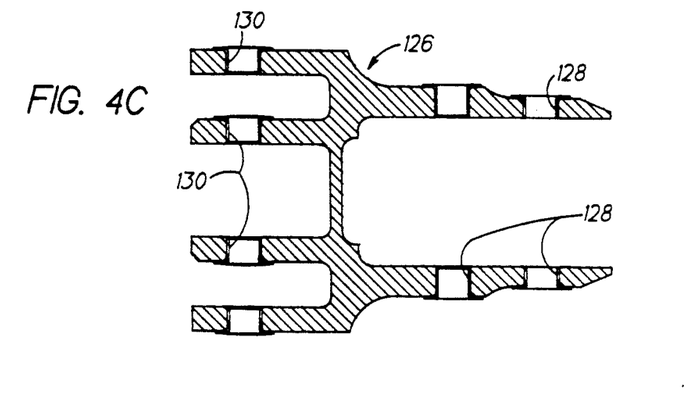

Each main rotor blade 104 is secured in combination with the corresponding rotor hub arm 108 by means of a spindle assembly 118 and a blade cuff 126 as illustrated generally in FIGS. 2, 3. With reference to FIGS. 4A, 4B, 4C, the spindle assembly 118 includes an inboard end 120, which is mechanically and functionally integrated in combination with the rotor hub arm 108, and an outboard end 122 having a clevis configuration (see FIG. 3) that includes retention pin apertures 124. The blade cuff 126 has a configuration that is complementary to the outboard end 122 of the spindle assembly 118 and the inboard end of the main rotor blade 104. The blade cuff 126 includes blade apertures 128 and retention pin apertures 130. Securing bolts SB (see FIGS. 2, 3) are inserted through the respective blade apertures 128 and the main rotor blade 104 to secure the blade cuff 126 to the main rotor blade 104. The retention pin apertures 124, 130 of the spindle assembly 118 and the blade cuff 126, respectively, are aligned and the blade retention pin system according to the present invention interacts with the aligned retention pin apertures 124, 130 to secure the blade cuff 126 in combination with the spindle assembly 118, as described in further detail hereinbelow. The spindle assembly 118, blade cuff 126 combination described hereinabove is a redesign that replaces the single-piece basic S-76® spindle, and is operative to accommodate manual blade folding operations by allowing the corresponding main rotor blade 104 to be pivoted about an axis defined by the blade retention pin system, as discussed in further detail hereinbelow. The corresponding damper 114 for each main rotor blade 104 is mechanically secured in combination therewith by means of an attachment bolt 132.

Each rotor hub arm 108 further includes a pitch control horn 134 having one end 134A thereof mechanically secured to the corresponding spindle assembly 118 and the other end 134B thereof mechanically secured to a pitch control rod 136. The end 134B of each pitch control horn 134 is configured to include a mounting lug 134L having an attachment aperture 134X to accommodate installation of the pitch actuation system restraint device, as described in further detail hereinbelow. Each pitch control rod 136 is mechanically secured in combination with the swashplate 112. The pitch control horns 134, the pitch control rods 136, and the swashplate 112 comprise elements of the pitch actuation system that are operative in combination to provide pitch inputs to the respective rotor blades 104.

The pitch actuation system restraint (PASR) device 140 is illustrated generally in FIG. 3. The PASR device 140 is operative to protect the components of the pitch actuation system from damage due to displacements induced in the main rotor blades 104 during manual blade folding operations by locking the respective pitch control horns 13 in position, thereby precluding any such displacements from being coupled into the pitch actuation system.

The PASR device 140 for the S-76® helicopter 100 comprises a permanent adapter bracket 142, a temporary adapter bracket 144, and three quick release pins 146. Each permanent adapter bracket 142 is configured to be permanently installed in combination with one rotor hub arm 108 utilizing the corresponding pair of damper lugs 116. The temporary adapter brackets 144 are only installed when the main rotor assembly 101 will be subjected to the manual blade folding operation. The temporary adapter bracket 144 is configured to be temporarily installed in combination with the permanent adapter bracket 142 utilizing two quick release pins 146. The temporary adapter bracket 144 is further configured to be temporarily installed in combination with the pitch change horn 134 (the mounting lug 134L thereof on the end 134B) utilizing the remaining quick release pin 146. The integrated PASR device 140 forms a rigid structural interconnection between the pitch change horn 134 and the adjacent rotor hub arm 108 that locks the pitch change horn 134 in position such that any displacements induced in the respective main rotor blade 104 during the manual blade folding operation cannot be coupled through the pitch change horn 134, i.e., into the pitch control rod 136 and/or swashplate 112 or other elements comprising the pitch actuation system. The structural and functional features of the PASR device 140 are described in further detail in commonly-owned, co-pending U.S. patent application Ser. No. 07/977,996, entitled "A Pitch Actuation System Restraint Device for A Helicopter Blade Folding System", filed Nov. 18, 1992, which is incorporated herein by reference.

The blade retention pin system 10 according to the present invention comprises a first pin assembly 12 and a second pin assembly 14, as illustrated in FIGS. 2, 3, that are operative, in combination, to secure the blade cuff 126 of the main rotor blade 104 to the corresponding spindle assembly 118. The blade retention pin system 10 according to the present invention secures the main rotor blades 104 in operative combination with the main rotor hub assembly 102 during operation of the main rotor assembly 101. The first and second pin assemblies 12, 14 of the blade retention pin system 10 are configured for easy installation and removal. The blade retention pin system 10 is readily reconfigurable for manual blade folding operations by removing one of first and second pin assemblies 12, 14, the remaining installed pin assembly 12 or 14 functioning as the pivotal axis during folding of the corresponding main rotor blade 104. The components comprising the first and second pin assemblies 12, 14 are relatively uncomplicated mechanically and are easily fabricated and assembled in combination to form the first and second pin assemblies 12, 14, respectively.

Figures 5, 5C, 5D, 5E:
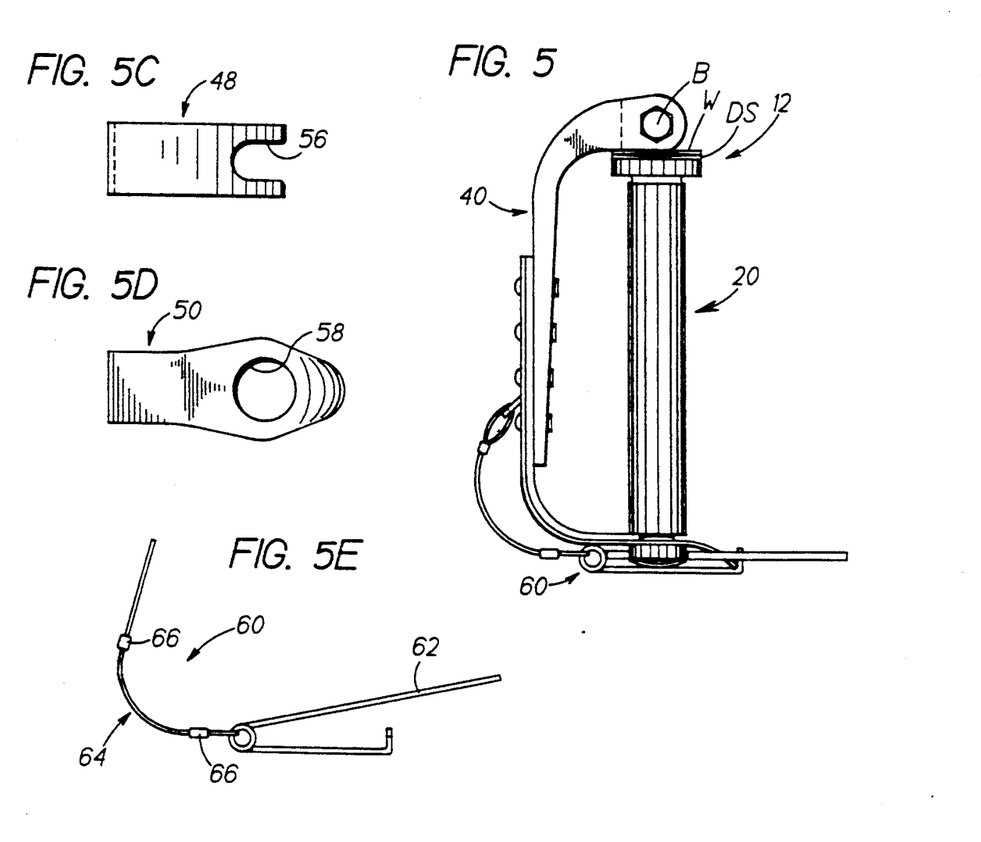
FIG. 5 is a side plan view of one pin assembly of a blade retention pin system according to the present invention.
FIG. 5C is a top plan view of the free end of a retainer member of the handle subassembly of FIG. 5B.
FIG. 5D is a top plan view of the free end of a spring member of the handle subassembly of FIG. 5B.
FIG. 5E is a side plan view of a safety pin subassembly of the pin assembly of FIG. 5.
Figure 5A:
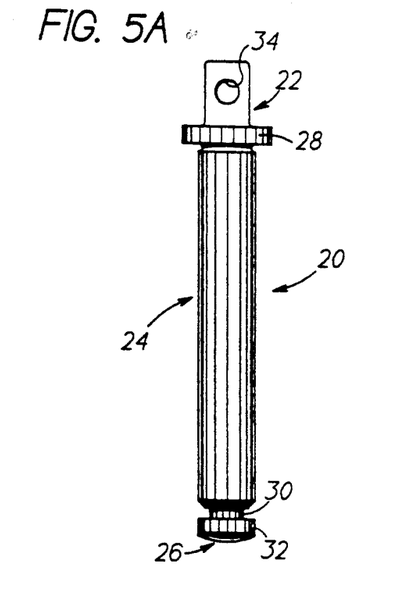
FIG. 5A is a side plan view of a pin retainer of the pin assembly of FIG. 5.

With reference to FIG. 5, the first and second pin assemblies 12, 14 each comprise a retainer pin 20 and a handle subassembly 40. The first pin assembly 12 comprises, in addition, a safety pin subassembly 60. The retainer pin 20 is illustrated in FIG. 5A and is fabricated as an integral component from a structurally rigid material such as steel and is sized and configured to react the dynamic loads developed in the main rotor assembly 101 during operation thereof, e.g., the centrifugal forces generated by the main rotor blade 104 during rotation thereof. The size and configuration of the retainer pin 20 complements the aligned retention pin apertures 124, 128 of the spindle assembly 118 and the blade cuff 126, respectively.

The retainer pin 20 includes a head portion 22, a body portion 24, and an arcuate end portion 26. A flange 28 separates the head portion 22 from the body portion 24, and a circumferential groove 30 separates the arcuate end portion 26 from the body portion 24. The arcuate end portion 26 has a safety pin aperture 32 formed therethrough. The head portion 22 has a handle aperture 34 formed therethrough.

Figure 5B:
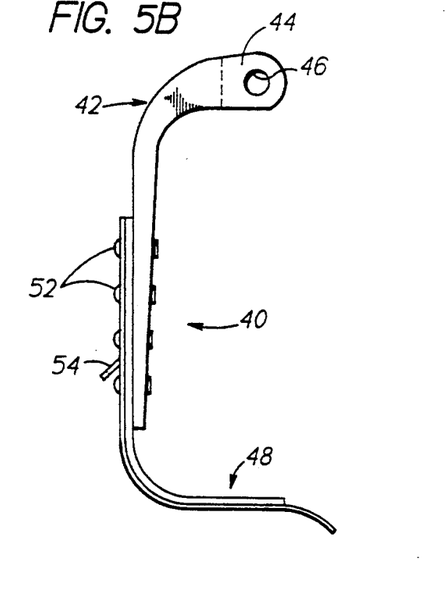
FIG. 5B is side plan view of a handle subassembly of the pin assembly of FIG. 5.

The handle subassembly 40 is illustrated in FIG. 5B and includes a handle member 42 having a cam-shaped head 44 with a clevis configuration that has an attachment aperture 46 formed therethrough, a retainer member 48, and a spring member 50. The retain member 48 and the spring member 50 are disposed in superposed abutting engagement and secured in combination with the handle member 42 by means of rivets 52. One of the rivets 52 is further utilized to incorporate a tab 54 as part of the handle subassembly 40. The free end of the retainer member 48 has a U-shaped slot 56 formed therein, as illustrated in FIG. 5C, the U-shaped slot 56 being dimensioned to facilitate the engagement thereof with the circumferential groove 30 of the retainer pin 20. The free end of the spring member 50 has an engagement aperture 58 formed therethrough, as illustrated in FIG. 5D, the engagement aperture 58 being dimensioned to facilitate force fitting thereof onto the arcuate end portion 26 of the retainer pin 20.

The safety pin subassembly 60 is illustrated in FIG. 5E and includes a safety pin 62, a cable 64, and locking clips 66. The safety pin 62 is sized and configured for insertion through the safety pin aperture 32 of the retainer pin 20, to extend between the first and second pin assemblies 12, 14 in the installed configuration, and to be self-locking. One end of the cable 64 is looped through an eyelet of the safety pin 62 and secured in the locking clip 66 to secure the cable 64 in combination with the safety pin 62.

To assemble the first and second pin assemblies 12, 14, the handle assembly 40 is rotatably mounted in combination with the retainer pin 20. This is achieved by positioning the cam-shaped head 44 about the head portion 22 so that the attachment aperture 46 and the handle aperture 34 are aligned, inserting a bolt B therethrough, and securing the bolt B in place by means of a nut (not shown). To enhance the pivoting action of the handle subassemblies 40 of the first and second pin assemblies 12, 14, a washer W and disc spring DS (see FIG. 5) may be disposed on each head portion 22 so as to be interposed between the cam-shaped head 44 and the flange 28. To complete the assembly of the first pin assembly 12, a safety pin subassembly 60 is secured in combination with the handle assembly 40 thereof by looping the free end of the cable 64 through the tab 54 and locking it in the locking clip 66.

As will be appreciated from a reading of the foregoing disclosure, there is a substantial identity between the first and second pin assemblies 12, 14 comprising the blade retention pin system 10, the only difference being that the first pin assembly 12 further includes the safety pin subassembly 60 secured in combination therewith. Such identity greatly facilitates the fabrication of the blade retention pin system 10 as well as the conversion of a first pin assembly 12 to a second pin assembly 14 and vice versa.

Figure 6:
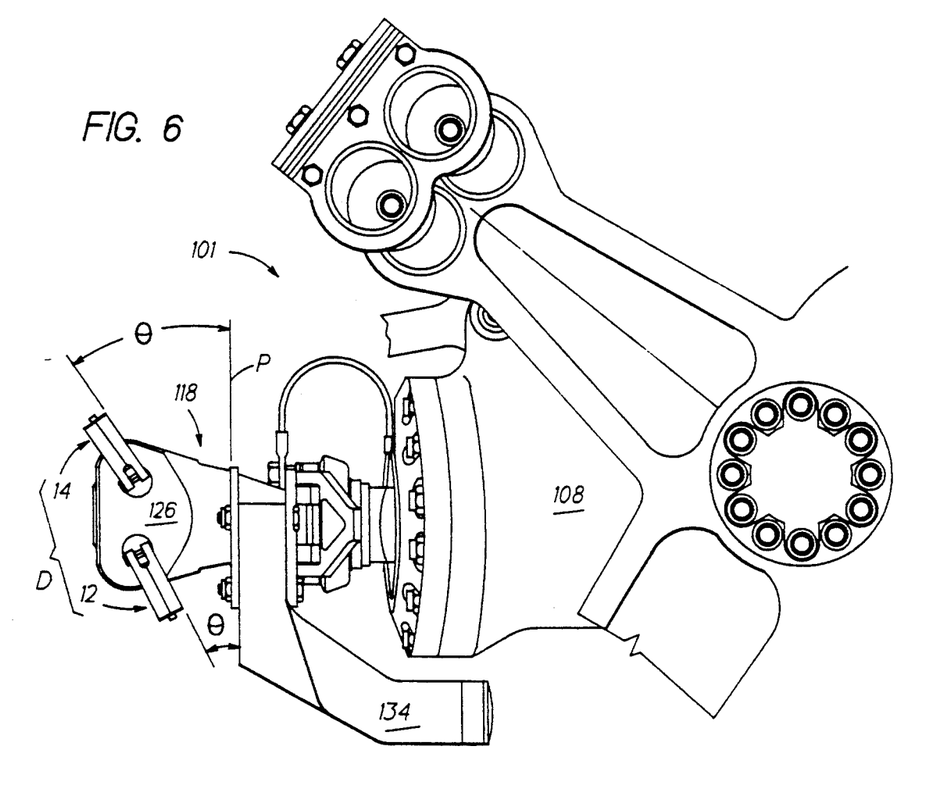
FIG. 6 illustrates the installation sequence for the pin assemblies comprising the blade retention pin system.

One blade retention pin system, which comprises the first and second pin assemblies 12, 14, is required to mechanically and functionally secure, i.e., install, one main rotor blade 104 in combination with the main rotor hub assembly 102. The installation procedure for the blade retention pin system 10 according to the present invention is illustrated in FIG. 6. Prior to implementing the procedure, the blade cuff 126 and the spindle assembly 118 are interfitted so that the retention pin apertures 124, 130 are aligned.

With the handle subassemblies 40 of the first and second pin assemblies 12, 14 in an unlocked position (step A), the retainer pins 20 are inserted through the aligned retention pin apertures 124, 130 to cause the flanges 28 thereof to abuttingly engage the upper surface of the blade cuff 126. In this position, the circumferential grooves 30 and the arcuate end portions 26 of the first and second pin assemblies 12, 14 extend beyond the lower surface of the blade cuff 126. The first pin assembly 12 is installed in the aligned retention pin apertures 124, 130 so as to be proximal the leading edge of the corresponding main rotor blade 104 while the second pin assembly 14 is installed in the aligned retention apertures 124, 130 proximal the trailing edge of the corresponding main rotor blade 104. By installing the first pin assembly 12 proximal the leading edge of the main rotor blade 104, the forces engendered by the rotating main rotor assembly 101 are harnessed to bias the installed safety pin 62 towards the trailing edge of the main rotor blade 104.

The handle subassemblies 40 of the first and second pin assemblies 12, 14 are then pivoted about the head portions 22 to the locked position (step B→step C). As each handle subassembly 40 is pivoted into the locked position (step C), the U-shaped slot 56 of the retainer member 48 is forced into abutting engagement with the circumferential groove 30 due to the pivoting motion of the handle subassembly 40. The pivoting motion of the handle subassembly 40 also causes the free end of the spring member 50 to slide over the arcuate end portion 26 of the retainer pin 20. When the engagement aperture 58 of the sliding spring member 50 is aligned with the arcuate end portion 26, the spring force exerted by the spring member 50 causes the engagement aperture 58 to be force fitted onto the arcuate end portion 26 until the spring member 50 abuts against the retainer member 48. Once the handle subassemblies 40 of the first and second pin assemblies 12, 14 are in the locked position, the safety pin 62 is sequentially inserted through the safety pin apertures 32 of the retainers 20 of the first and second pin assemblies 12, 14, respectively. After the safety pin 62 is inserted, it is manually closed and locked to complete the installation procedure for the blade retention pin system 10.

The blade retention pin system 10 according to the present invention provides a redundant locking capability to ensure that the first and second pin assemblies 12, 14 remain locked in the installed position during operation of the main rotor assembly 101. The retainer member 48 and the spring member 50 of the handle assembly 40, acting in combination, provide the first locking capability (utilization of the disc spring DS discussed hereinabove also enhances the first locking capability) by mechanically engaging the retainer pin 20, thereby preventing inadvertent disengagement thereof rom the aligned retention pin apertures 124, 130. The installed safety pin 62 provides the second locking capability by mechanically securing the retainer member 48 and the spring member 50 in mechanical engagement with the retainer pin 20.

Figure 7:
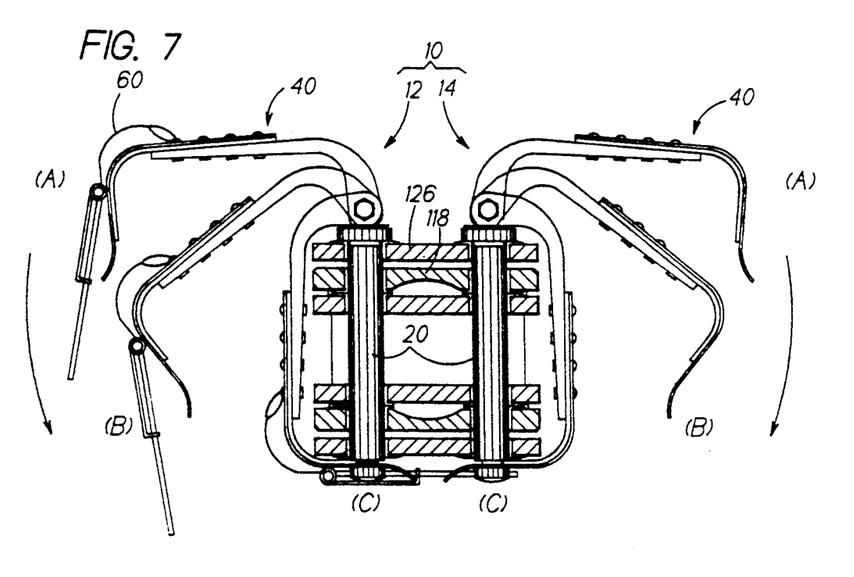
FIG. 7 illustrates the installation orientation of the pin assemblies of the blade retention pin system for the main rotor assembly of the S-76 ® helicopter.

An installed blade retention pin system 10 is exemplarily illustrated in FIG. 7. The blade retention pin system 10 according to the present invention, as well as the pitch actuation system restraint device 140 described and claimed in copending, commonly-owned U.S. patent application Ser. No. 07/977,996, entitled "A Pitch Actuation System Restraint Device For A Helicopter Blade Folding System", filed Nov. 18, 1992, have been design optimized for utilization with the modified S-76® main rotor assembly 101 described hereinabove. As part of the design optimization process, modifications to he existing S-76® main rotor assembly 101, to support manual blade folding operations, were minimized. As a result of this design constraint, the modified S-76® main rotor assembly 101 described hereinabove utilizes the original dampers 114. In light of this design characteristic, there is a clearance constraint between the second pin assembly 14 (the trailing edge pin assembly) and the corresponding damper 114. The first and second pin assemblies 12, 14, therefore, are installed so that the handle subassemblies 40 thereof are orientated at a predetermined angle $\theta$ with respect to a plane P (perpendicular to the axis of the rotor hub arm 108).

For the described embodiment, the predetermined orientation angle $\theta$ is about 30°±5°. With the first and second pin assemblies 12, 14 aligned in this orientation, there is sufficient clearance between the damper 114 and the second pin assembly 14 so that the handle subassembly 40 thereof may be pivotally operated between the locked and unlocked positions. While a clearance constraint does not exist with respect to the first pin assembly 12, the first pin assembly 12 must be correspondingly orientated so that the safety pin aperture 32 thereof is properly aligned with the safety pin aperture 32 of the second pin assembly 14 to enable insertion of the safety pin 62.

Figure 8:
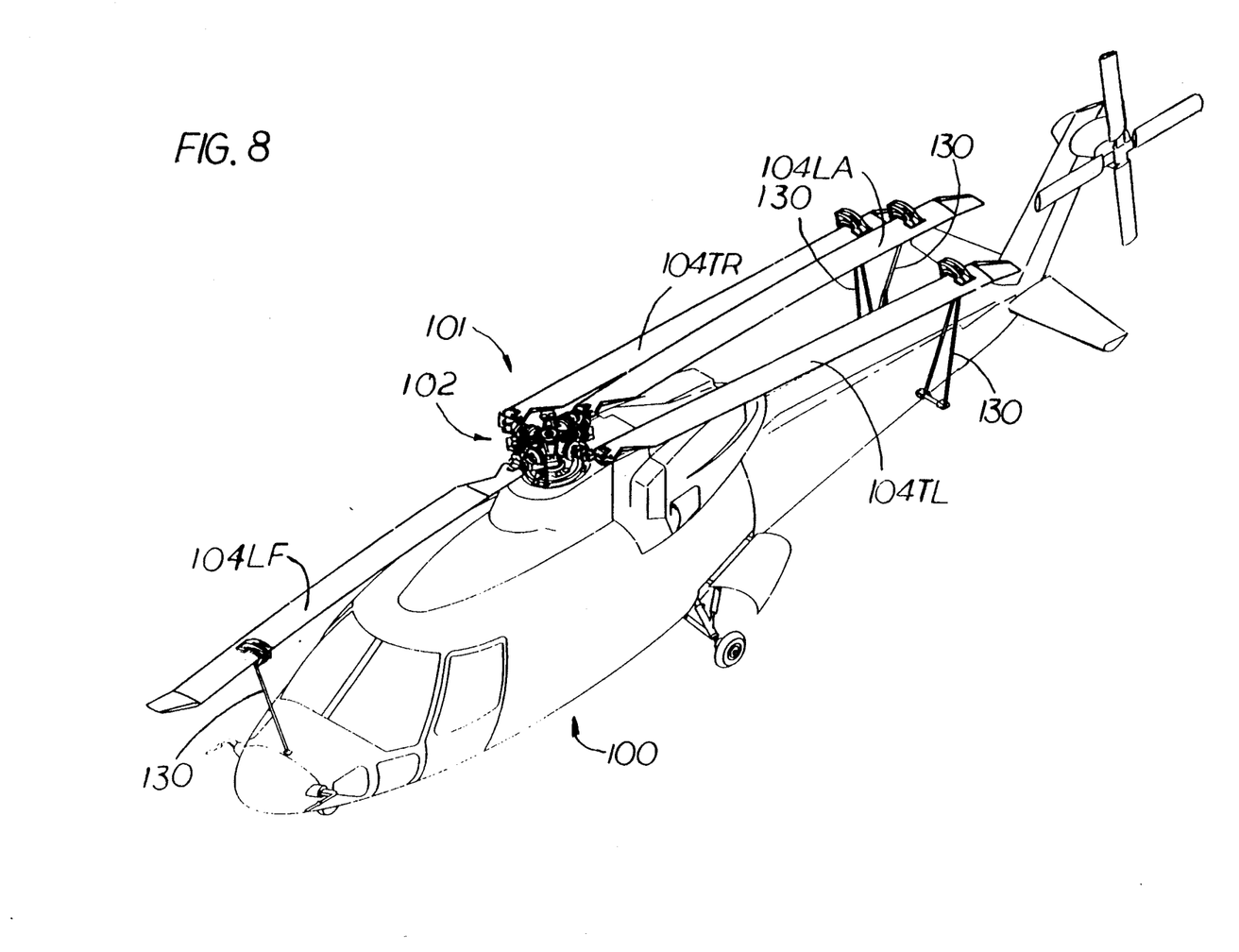
FIG. 8 illustrates the stowage configuration of the main rotor assembly of the S-76 ® helicopter after a manual blade folding operation.

To initiate the manual blade folding operation for the S-76® helicopter 100, the main rotor assembly 101 is indexed so that one pair of opposed main rotor blades 104 is substantially aligned with the longitudinal axis of the helicopter 100 (see FIGS. 1, 8). This results in the other pair of opposed main rotor blades 104 extending transversely with respect to the longitudinal axis of the helicopter 100. The transversely extending main rotor blades 104 are the only rotor blades subjected to the manual blade folding operation in the S-76® helicopter 100.

The pitch control horn 126 of each transversely extending blade 104 is locked in position by means of the PASR device 140 described hereinabove to preclude any displacements induced in the main rotor blade 104 being folded from being coupled into the pitch actuation system of the helicopter 100. Once the PASR devices 140 have been installed (the specific installation procedure is described in co-pending, commonly-owned U.S. patent application Ser. No. 07/977,996, entitled "A Pitch Actuation System Restraint Device for A Helicopter Blade Folding System", filed Nov. 18, 1992), the attachment bolts 132 are removed to disengage the corresponding dampers 114 from the transversely orientated main rotor blades 104TL, 104TR.

The blade retention pin system 10 is then reconfigured to accommodate the manual blade folding operation. First, the safety pin 62 is unlocked and disengaged from the safety pin apertures 32 of the retainer pins 20 of the first and second pin assemblies 12, 14. Next, the spring member 50 of the forward pin assembly 12 or 14 is manually disengaged from the retainer pin 20, and the handle subassembly 40 thereof pivoted from the locked position to the unlocked position (step C→step B→step A as illustrated in FIG. 6) to disengage the retainer member 48 from the circumferential groove 30. The unlocked pin assembly 12 or 14 is then removed from the aligned retention pin apertures 124, 130. The remaining installed pin assembly 12 or 14 functions as the pivotal axis for the manual blade folding operation.

Figure 8A:
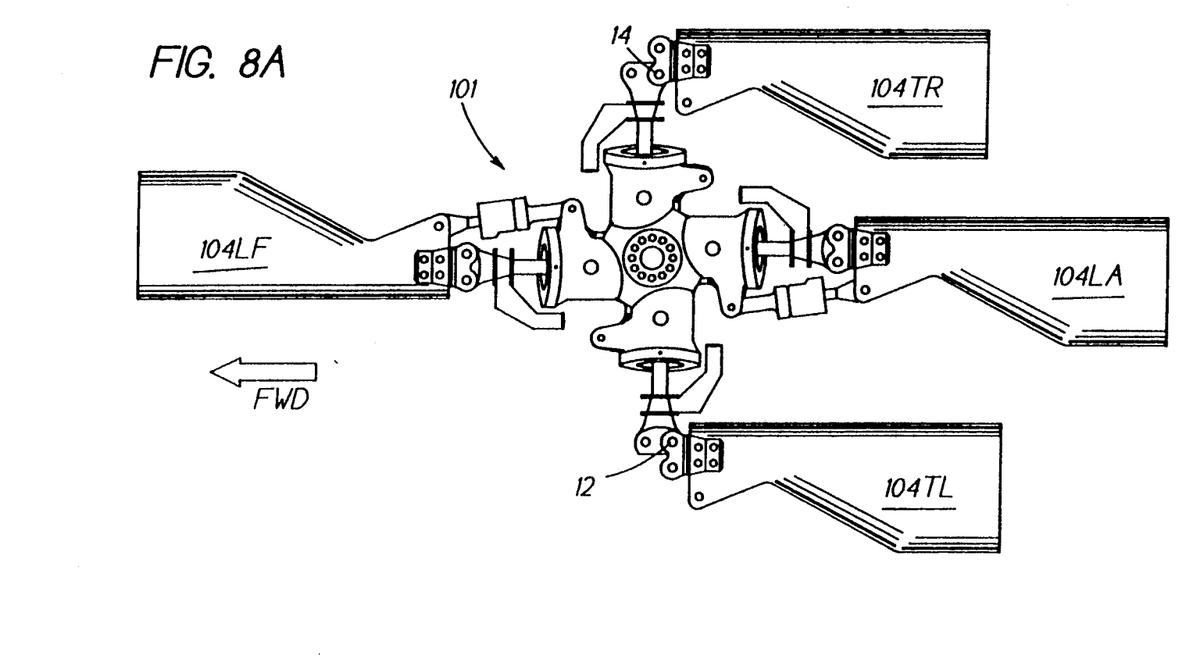
FIG. 8A is an enlarged, partial plan view of the main rotor assembly of FIG. 8.

Which pin assembly 12 or 14 is removed and which pin assembly 12 or 14 remains installed is dependent upon which the transversely orientated main rotor blades 104TL, 104TR is being configured for the blade folding operation (since the first pin assembly 12 is installed proximal the leading edge of the main rotor blade 104). With reference to FIG. 8A, the first pin assembly 12 functions as the pivotal axis for the transversely orientated blade 104TL and the second pin assembly 14 functions as the pivotal axis for the transversely orientated blade 104TR.

Removal of the second and first pin assemblies 14, 12 allows the main rotor blades 104TL, 104TR, respectively, to be rotated about the axes defined by the first and second pin assemblies 12, 14, respectively. The transversely orientated main rotor blades 104TL, 104TR are manually rotated, respectively, towards the empennage structure of the helicopter 100 into the stowage configuration illustrated in FIG. 8. Clamping means 130 are attached to the tip segments of the rotor blades 104TL, 104TR, 104LF, 104LA and the fuselage of the helicopter 100 to immobilize the rotor blades 104 in the stowage configuration.

In the stowage configuration, the overall structural envelope of the helicopter is significantly reduced. In addition, the main rotor blades, particularly the folded main rotor blades, are less vulnerable to the effects of winds. To prepare the helicopter 100 for subsequent flight operations, the above-described procedure is accomplished step-by-step in the reverse order to unfold the main rotor blades 104TL, 104TR to a flight configuration, and to secure the main rotor blades 104TL, 104TR in combination with the main rotor hub assembly 102 utilizing the blade retention pin system 10 described hereinabove.

The blade retention pin system according to the present invention is described hereinabove in terms of the particular mechanical features of the main rotor assembly 101 of the S-76® helicopter. Such features include the main rotor hub assembly 102 having spindle assemblies 118 mechanically and functionally integrated with the rotor hub arms 108 thereof, and wherein the main rotor blades 104 are secured in combination with the main rotor hub assembly 102 utilizing the spindle assemblies 118. One skilled in the art, however, will appreciate that the blade retention pin system according to the present invention may be utilized with the main rotor assemblies of other helicopters wherein pin connections are utilized to secure each main rotor blade in combination with the main rotor assembly.

For example, the blade retention pin system according to the present invention may be utilized in a composite rotor head comprised of a central hub having integrally formed therewith a plurality of radially extending flexbeams, as exemplarily illustrated in U.S. Pat. No. 5,091,029 wherein the main rotor blades are secured in combination with the outboard ends of the flexbeams by means of pin connections. The blade retention pin system may also be utilized in a main rotor assembly wherein the main rotor blades are secured in combination with the rotor hub utilizing pin connections and a torque tube, yoke combination, as exemplarily illustrated in U.S. Pat. Nos. 4,585,393 and 4,568,245. Another main rotor assembly configuration utilizing pin connections for securing the main rotor blades in combination with the rotor hub is exemplarily illustrated in U.S. Pat. No. 4,975,021.

A variety of modifications and variations are possible in light of the above teachings. For example, the blade retention pin assembly according to the present invention may be utilized in helicopters having main rotor assemblies with more or less main rotor blades, and/or to facilitate manual folding operations for more than two main rotor blades. Furthermore, the first pin assembly of the blade retention pin system described hereinabove may be used in combination with a securing hinge pin such as a bolt, nut combination to provide a manual blade folding capability for a helicopter main rotor assembly. For this embodiment, the securing hinge pin functions as the main rotor blade folding axis and the first pin assembly is removable to reconfigure the main rotor assembly for blade folding operations. For this particular embodiment, software is required to index the main rotor assembly to a specific orientation such that the main rotor blades to be folded have the first pin assemblies installed forward of the securing hinge pins. And while the blade retention pin assembly has been described hereinabove in terms of its utility for main rotor blade folding operations, one skilled in the art will appreciate that the blade retention pin assembly according to the present invention may be readily utilized for main rotor blade removal/installation procedures. It is therefore to be understood that, within the scope of the appended claims, the invention may be practiced otherwise than as specifically described herein.

What is claimed is:

1. In Combination with a helicopter main rotor assembly configured for manual blade folding operations, the main rotor assembly including a main rotor hub assembly having a plurality of rotor hub arms, each rotor hub arm having a spindle assembly mechanically and functionally interconnected therewith, a blade retention pin system for operatively installing a main rotor blade having a blade cuff secured in combination therewith in secured combination with the spindle assembly of the corresponding rotor hub arm, said blade retention pin system being readily reconfigurable to facilitate manual folding of the main rotor blade, comprising:

a second pin assembly including
 a retainer pin, and
 a handle subassembly pivotably mounted in combination with said retainer pin, said handle subassembly being pivotable from an unlocked position to a locked position and vice versa, said handle subassembly having means secured in combination therewith for mechanically engaging said retainer pin with said handle subassembly in the locked position; and a first pin assembly including
 a retainer pin,
 a handle subassembly pivotably mounted in combination with said retainer pin, said handle subassembly being pivotable from an unlocked position to a locked position and vice versa, said handle subassembly having means secured in combination therewith for mechanically engaging said retainer pin with said handle subassembly in the locked position, and
 a safety pin subassembly secured in combination with said handle subassembly, said safety pin subassembly including means for mechanically engaging said retainer pins of said first and second pin assemblies with said handle subassemblies thereof in the locked position;

wherein said retainer pins of said first and second pin assemblies are insertable in aligned apertures of the spindle assembly and the blade cuff, the handle assemblies of said first and second pin assemblies are pivotable from the unlocked position to the locked position to cause said mechanical engaging means thereof to mechanically engage said respective retainer pins and lock said respective retainer pins in position, and said mechanical engaging means of said safety pin subassembly is mechanically engageable with said retainer pins of said first and second pin assemblies to operatively install the main rotor blade in secured combination with the corresponding rotor hub arm;

and further wherein said mechanical engaging means of said safety pin subassembly is mechanically disengageable from said retainer pins of said first and second pin assemblies, said handle subassembly of one of said first and second pin assemblies is pivotable from the locked position to the unlocked position to disengage said mechanical engaging means from said respective retainer pin, and said one pin assembly is removable from the aligned apertures of the spindle assembly and the blade cuff to reconfigure said blade retention pin system for manual folding of the main rotor blade, said other of said first and second pin assemblies remaining locked in position to function as a rotational axis for manual folding of the main rotor blade.

2. The blade retention pin system of claim 1 wherein each of said retainer pins of said first and second pin assemblies is an integral member comprising a head portion, a body portion, an arcuate end portion, and a flange separating said head portion from said body portion, said body portion having a circumferential groove formed therein to separate said arcuate end portion from said body portion, said head portion having a handle aperture formed therethrough for pivotably mounting said handle subassembly in combination therewith and said arcuate end portion having a safety pin aperture formed therethrough for mechanical engagement of said mechanical engaging means of said safety pin subassembly.

3. The blade retention pin system of claim 1 wherein each of said handle subassemblies of said first and second pin assemblies comprises a handle member configured to be pivotably mounted in combination with said retainer pin, a retainer member secured in combination with said handle member, said retainer member including a free end having a U-shaped slot formed therein for mechanically engaging said retainer pin, and a spring member secured in combination with said handle member, said spring member including a free end having an engagement aperture formed therethrough for mechanically engaging said retainer pin, and wherein said retainer member and said spring member are disposed in superposed abutting combination in the unlocked and locked positions, said retainer member and said spring member in superposed abutting combination comprising said mechanical engaging means of said handle subassembly.

4. The blade retention pin system of claim 1 wherein said safety pin subassembly further comprises a safety pin that is manually self-lockable and a cable, one end of said cable being secured to said safety pin and the other end of said cable being secured to said handle subassembly of said first pin assembly, said manually self-locking safety pin comprising said mechanical engaging means of said safety pin subassembly.

5. The blade retention pin system of claim 1 wherein each of said retainer pins of said first and second pin assemblies is an integral member comprising a head portion, a body portion, and an arcuate end portion having a safety pin aperture formed therethrough, said body portion having a circumferential groove formed therein to separate said arcuate end portion from said body portion; and further wherein each of said handle subassemblies of said first and second pin assemblies comprises a handle member pivotably mounted in combination with said head portion of said retainer pin, a retainer member secured in combination with said handle member, and a spring member secured in combination with said handle member and disposed in superposed abutting combination with said retainer member, said retainer member including a free end having a U-shaped slot formed therein that is configured to mechanically engage said circumferential groove of said retainer pin with said handle member pivoted to the locked position, and said spring member including a free end having an engagement aperture formed therethrough that is configured for mechanical engagement onto said arcuate end portion of said retainer pin with said handle member pivoted to the locked position, said superposed abutting combination of said retainer member and said spring member comprising said mechanical engaging means of said handle subassembly.

6. The blade retention pin system of claim 5 wherein said safety pin subassembly further comprises a safety pin that is manually self-lockable and a cable, one end of said cable being secured to said safety pin and the other end of said cable being secured to said handle member, said safety pin being sized and configured for insertion through said safety pin apertures of said retainer pins of said first and second pin assemblies as locked in position.

7. In combination with a helicopter main rotor assembly configured for manual blade folding operations, the main rotor assembly including a main rotor hub assembly having a plurality of rotor hub arms, each rotor hub arm having a spindle assembly mechanically and functionally interconnected therewith, a blade retention pin system for operatively installing a main rotor blade having a blade cuff secured in combination therewith in secured combination with the spindle assembly of the corresponding rotor hub arm, said blade retention pin system being readily reconfigurable to facilitate manual folding of the main rotor blade, comprising:

a second pin assembly that includes
 a retainer pin formed as an integral member including a head portion, a body portion, and an arcuate end portion having a safety pin aperture formed therethrough, said body portion having a circumferential groove formed therein to separate said arcuate end portion from said body portion, and
 a handle subassembly that includes a handle member pivotably mounted in combination with said head portion of said retainer pin and operative to be pivoted from an unlocked position to a locked position and vice versa, a retainer member secured in combination with said handle member, and a spring member secured in combination with said handle member and disposed in superposed abutting combination with said retainer member, said retainer member including a free end having a U-shaped slot formed therein that is configured to mechanically engage said circumferential groove of said retainer pin with said handle member pivoted to the locked position, and said spring member including a free end having an engagement aperture formed therethrough that is configured for mechanical engagement onto said arcuate end portion of said retainer pin; and a first pin assembly that includes
 a retainer pin formed as an integral member including a head portion, a body portion, and an arcuate end portion having a safety pin aperture formed therethrough, said body portion having a circumferential groove formed therein to separate said arcuate end portion from said body portion,
 a handle subassembly that includes a handle member pivotably mounted in combination with said head portion of said retainer pin and operative to be pivoted from an unlocked position to a locked position and vice versa, a retainer member secured in combination with said handle member, and a spring member secured in combination with said handle member and disposed in superposed abutting combination with said retainer member, said retainer member including a free end having a U-shaped slot formed therein that is configured to mechanically engage said circumferential groove of said retainer pin with said handle member pivoted to the locked position, and said spring member including a free end having an engagement aperture formed therethrough that is configured for mechanical engagement onto said arcuate end portion of said retainer pin, and
 a safety pin subassembly that includes a manually self-lockable safety pin and a cable, one end of said cable being secured to said safety pin and the other end of said cable being secured to said handle member;

wherein said retainer pins of said first and second pin assemblies are insertable in aligned apertures of the spindle assembly and the blade cuff, said handle members of said first and second pin assemblies are pivotable from the unlocked position to the locked position to cause said U-shaped slots of said retainer members to mechanically engage said circumferential grooves of said retainer pins and to cause said engagement holes of said spring members to mechanically engage said arcuate end portions of said retainer pins to lock said respective retainer pins in position, and said safety pin is insertable through said safety pin apertures of said retainer pins of said first and second pin assemblies and manually lockable to operatively install the main rotor blade in secured combination with the corresponding rotor hub arm;

and further wherein safety pin is manually unlockable and disengageable from said safety pin apertures of said retainer pins of said first and second pin assemblies, said spring member of said first and second pin assembly adjacent the leading edge of the main rotor blade is manually disengageable from said arcuate end portion of said corresponding retainer pin, said handle member of said handle subassembly is pivotable to the unlocked position wherein said U-shaped slot of said retainer member is mechanically disengaged from said circumferential groove of said corresponding retainer pin, and said pin assembly is removable from the aligned apertures of the spindle assembly and the blade cuff to reconfigure said blade retention pin system for manual folding of the main rotor blade, said other pin assembly remaining locked in position to function as a rotational axis for manual folding of the main rotor blade.

8. In combination with a helicopter main rotor assembly including a rotor hub and a plurality of main rotor blades secured in combination with the rotor hub by pin connections, a blade pin retention system for operatively installing one main rotor blade in secured combination with the rotor hub, said blade retention pin system being readily reconfigurable to facilitate manual folding of the one main rotor blade, comprising:

a securing hinge pin installable in combination with the one main rotor blade and the rotor hub to provide one pin connection for securing the one main rotor blade in combination with the rotor hub, said securing hinge pin functioning as a rotation axis for manual folding of the one main rotor blade; and a pin assembly installable in combination with the one main rotor blade and the rotor hub to provide one pin connection for securing the one main rotor blade in combination with the rotor hub, said pin assembly including a retainer pin installable in combination with the one main rotor blade and the rotor hub to provide the one pin connection for securing the one main rotor blade in combination with the rotor hub, said retainer pin being formed as an integral member including a head portion, a body portion, an arcuate end portion having a safety pin aperture formed therethrough, and a flange separating said head portion from said body portion, said body portion having a circumferential groove formed therein to separate said arcuate end portion from said body portion, a handle subassembly that includes a handle member pivotably mounted in combination with said head portion of said retainer pin and operative to be pivoted from an unlocked position to a locked position and vice versa, a retainer member secured in combination with said handle member, and a spring member secured in combination with said handle member and disposed in superposed abutting combination with said retainer member, said retainer member including a free end having a U-shaped slot formed therein that is configured to mechanically engage said circumferential groove of said retainer pin with said handle member pivoted to the locked position, and said spring member including a free end having an engagement aperture formed therethrough that is configured for mechanical engagement onto said arcuate end portion of said retainer pin, and a safety pin subassembly that includes a manually self-lockable safety pin and a cable, one end of said cable being secured to said safety pin and the other end of said cable being secured to said handle member;

wherein said securing hinge pin is installed and secured in combination with the one main rotor blade and the rotor hub, and said retainer pin is installable in combination with the one main rotor blade and the rotor hub, said handle member is pivotable from the unlocked position to the locked position to cause said U-shaped slot of said retainer member to mechanically engage said circumferential groove of said retainer pin and to cause said engagement hole of said spring member to mechanically engage said arcuate end portion of said retainer pin to lock said retainer pin in position, and said safety pin is insertable through said safety pin aperture of said retainer pin and manually lockable to operatively install the one main rotor blade in secured combination with the rotor hub;

and further wherein said safety pin is manually unlockable and disengageable from said safety pin aperture of said retainer pin, said spring member is manually disengageable from said arcuate end portion of said retainer pin, said handle member of said handle subassembly is pivotable to the unlocked position wherein said U-shaped slot of said retainer member is mechanically disengaged from said circumferential groove of said retainer pin, and said pin assembly is removable to reconfigure said blade retention pin system for manual folding of the one main rotor blade, said securing hinge pin remaining locked in the installed position to function as the rotation axis for manual folding of the one main rotor blade.

9. For use in a helicopter main rotor assembly including a rotor hub and a plurality of main rotor blades secured in combination with the rotor hub by pin connections, a pin assembly comprising:

a retainer pin installable in combination with one main rotor blade and the rotor hub to provide one pin connection for securing the one main rotor blade in combination with the rotor hub, said retainer pin being formed as an integral member including a head portion, a body portion, an arcuate end portion, and a flange separating said head portion from said body portion, said body portion having a circumferential groove formed therein to separate said arcuate end portion from said body portion; and a handle subassembly that includes a handle member pivotably mounted in combination with said head portion of said retainer pin and operative to be pivoted from an unlocked position to a locked position and vice versa, a retainer member secured in combination with said handle member, and a spring member secured in combination with said handle member and disposed in superposed abutting combination with said retainer member, said retainer member including a free end having a U-shaped slot formed therein that is configured to mechanically engage said circumferential groove of said retainer pin with said handle member pivoted to the locked position, and said spring member including a free end having an engagement aperture formed therethrough that is configured for mechanical engagement onto said arcuate end portion of said retainer pin.

10. The pin assembly of claim 9 further comprising a safety pin subassembly that includes a manually self-lockable safety pin and a cable, one end of said cable being secured to said safety pin and the other end of said cable being secured to said handle member.

* * * * *